United States Patent [19]

Jackson et al.

[11] Patent Number: 5,552,982
[45] Date of Patent: Sep. 3, 1996

[54] METHOD AND SYSTEM FOR PROCESSING FIELDS IN A DOCUMENT PROCESSOR

[75] Inventors: Peter C. Jackson, Seattle; William H. Gates, III, Redmond; Bryan Loofbourrow, Seattle, all of Wash.

[73] Assignee: Microsoft Corporation, Redmond, Wash.

[21] Appl. No.: 205,141

[22] Filed: Feb. 28, 1994

Related U.S. Application Data

[63] Continuation of Ser. No. 694,001, Apr. 30, 1991, abandoned, which is a continuation of Ser. No. 607,872, Oct. 31, 1990, abandoned.

[51] Int. Cl.$^6$ .................................................. G06F 17/22
[52] U.S. Cl. ................................ 364/419.1; 364/419.17; 395/145
[58] Field of Search .................. 364/419.19, 419.14, 364/419.17, 419.1; 395/146, 600, 147, 148, 145

[56] References Cited

U.S. PATENT DOCUMENTS

| | | | |
|---|---|---|---|
| 4,965,763 | 10/1990 | Zamora | 364/419.19 |
| 5,025,396 | 6/1991 | Parks et al. | 395/147 |
| 5,148,366 | 9/1992 | Buchanan et al. | 395/146 |

OTHER PUBLICATIONS

"Using Microsoft Word", Word Processing Program Version 3.0 ©Microsoft Corporation '86. pp. 259–273.

"Parallel Computations on Strings & Arrays", Crochemore et al ©1990 Springer–Verlag, Germany.

"Numeric Processor and Text Manipulator for the 'Master Contro' Data Base Management System", Energy Research & Den't Admin. Feb. 1976.

"Using Microsoft Word" Version 3 ©1983, 1985, 1986. pp. 259–273.

"Switch" definition, *Microsoft Press–Computer Dictionary*, second edition, copyright 1994, p. 378.

"Switch" and Switch Code definitions, *Dictionary of Computers, Information Processing, and Telecommunications*, second edition, copyright 1984, pp. 617–618.

*Primary Examiner*—Robert A. Weinhardt
*Attorney, Agent, or Firm*—Seed and Berry LLP

[57] ABSTRACT

A method and system for providing calculated fields in a document processing environment. A calculated field comprises a beginning field character, a field code, and an ending field character. The field code specifies a behavior of the calculated field. A user may insert a calculated field into a document. After insertion, the result of the calculated field can be determined based on the behavior specified by the field code. The result of the calculated field is then stored within the document and preferably within the calculated field. The document can be displayed in either field code or results mode. In field code mode, when the document is displayed, the calculated field is displayed (i.e., beginning field character, field code, and ending field character). In results mode, when the document is displayed, the result is displayed, rather than the calculated field.

27 Claims, 15 Drawing Sheets

METHOD AND SYSTEM FOR PROCESSING FIELDS IN A DOCUMENT PROCESSOR

CROSS-REFERENCE TO RELATED APPLICATION

This application is a continuation of U.S. patent application Ser. No. 07/694,001, filed Apr. 30, 1991, now abandoned.

FIELD OF THE INVENTION

This invention relates to the field of document processors, and more particularly, to a method and system for allocating and displaying fields in a document processor.

BACKGROUND OF THE INVENTION

Document processors are a class of computer application programs which provide the ability to manipulate, display, and print text and graphics in a variety of formats. One example of a popular document processor program is the Microsoft Word document processor available from Microsoft Corporation. Typically, in most document processors, text may be produced in a variety of fonts, sizes, styles, and paragraph formats. While a number of computer programs provide similar capabilities, document processors provide flexibility and capabilities not found in other programs.

For example, in computer spreadsheet application programs, text information or numerical data is identified with a particular cell which is positioned according to x-y coordinates in the spreadsheet. In this type of system, specific formatting information is associated with individual cells. Thus, the data or text within the cells is easily associated with formatting information based on its relative position in the spreadsheet application. In contrast, in a document processor, text or graphic information may be placed in a document in a position which is dependent primarily on its position within a text string wherein its actual position within a document changes as text or graphic objects are added or deleted from the text string.

Since character positions are variable within a document processed by a document processor, it is extremely difficult to provide fields within such a document. Fields are similar to the formula in cells provided in a spreadsheet application program wherein the contents of a field may be dependent on the mathematical relationship between a plurality of other values.

SUMMARY AND OBJECTS OF THE INVENTION

In summary, the present invention contemplates a method and system for providing fields in a document processing environment wherein fields may be included within a stream of text. Fields are processed by a single generic field handling mechanism which invokes field-specific functions. Fields are delineated with unique beginning and ending field characters, which enclose a field keyword as well as field arguments. The keyword of a field determines the type of the field. When a field is encountered in a document, the keyword and arguments are parsed and field-specific functions are invoked through a look-up table that is indexed by the keyword. Field results are generated based on field arguments. The present invention provides a means whereby fields may be displayed in a result mode or field code mode. In addition, arguments of one field may be generated from the result of another field.

Accordingly, it is an object of the present invention to provide an improved method and system for processing documents providing a single mechanism for handling all types of fields.

It is another object of the present invention to provide an improved method and system for generating field results and inserting field results in fields.

It is another object of the present invention to provide a document processor system wherein a variety of field types may be added to the system or the functioning of existing field modified without altering the basic mechanism for handling fields.

It is still another object of the present invention to provide a method and system for implementing nested fields in a document processing environment.

It is still another object of the present invention for applying general switches to the result of a field in a document processor system.

It is yet another object of the present invention to provide a method and system for determining the portion of field to be displayed and for adjusting a page layout in a document processor accordingly.

BRIEF DESCRIPTION OF THE DRAWINGS

These and other objects will be apparent from the description below and the accompanying drawings in which.

DETAILED DESCRIPTION OF THE INVENTION

Figure 1A:
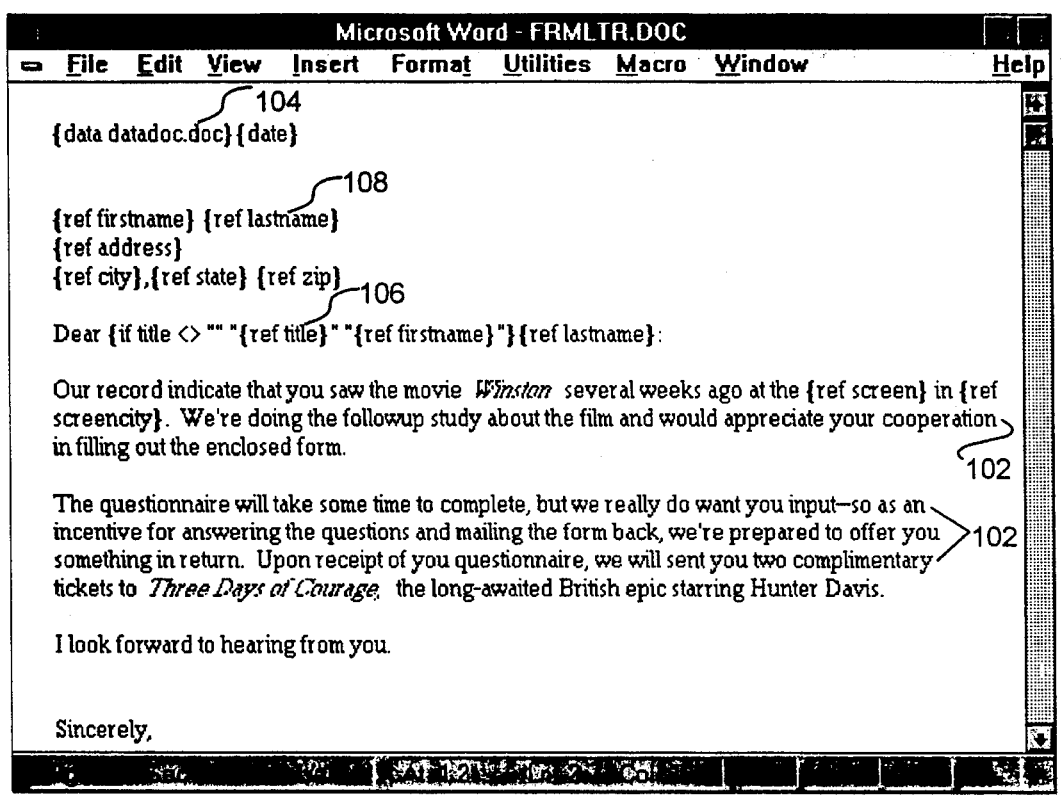
FIGS. 1A and 1B are diagrams of displays showing documents having fields of the type processed by the present invention.

The present invention provides a method and system for use with a document processor application program which allows a user to insert "calculated text" or "fields" virtually anywhere in a document. The present invention provides a single mechanism for handling all fields, wherein the specific behavior of a field is defined by a field specific algorithm that is invoked by the generic field mechanism. This allows the generic field mechanism of the present invention to be incorporated in an application program without regard to the specific behavior of individual fields.

In the context of the present invention, a "field" is defined as a placeholder object that is evaluated to produce a result. A "field" is used to implement generated objects such as page numbers, dates, or cross references. A field comprises a beginning field character, field codes, a separator field character, a field result, and an ending field character specified according to the following syntax:

{field codes|result}

The field codes in the above expression are typically entered in a text stream as ordinary text and may be edited or modified as any other character in the text stream. The beginning field character ("{"), the ending field character ("}"), the separator character ("|"), and the result are generated by the application. Fields are used in two modes: field code mode and result mode. In the field code mode, the beginning field character, the field codes, and the ending field character are displayed. In the result mode, only the result of the field codes is displayed. Field codes consist of a keyword that identifies the field type, field arguments of the field type, switches specific to the field type, and general switches, called "system switches." A switch consists of a backslash character ("\"), a single character switch identifier (e.g., "*"), and optionally a switch argument.

The keyword of a field identifies the type of the field. If the keyword is not known, then the field is considered to be a bookmark reference and the keyword is the bookmark name.

A keyword may optionally be preceded by a backslash character ("\"). If a keyword is not known and is preceded by a backslash, it will not be treated as a bookmark reference. Rather, the field will have no result.

Arguments, both field and switch, are words separated by one or more spaces. However, a space between a switch identifier and the switch argument is optional. A multi-word argument is obtained by surrounding it with quotes ("). A quote can be placed within an argument by preceding it with a backslash character (\") as shown below.

Examples of arguments:

| Field Codes | Arguments |
| --- | --- |
| foo bar | foo |
|  | bar |
| "foo bar" | foo bar |
| "foo \" bar" | foo " bar |
| \"Joe\" | "Joe" |
| "John \"Johnny\"" | John "Johnny" |
| \\ \" | \ |
|  | " |
| abc"def"ghi | abc |
|  | def |
|  | ghi |
| foo "" bar | foo |
|  | (empty string) |
|  | bar |

In the preferred practice of the present invention, fields can be nested, up to a pre-selected limit, such as twenty deep. The only restriction on nesting is that the keyword for a field cannot be a nested field. Any argument can be a nested field. If there is a nested field in an argument or switch, the result of the nested field will be used to evaluate the enclosing field.

A field nested within field codes is treated as a single argument or switch, regardless of the presence of spaces or quotes in the result of the nested field. It is also considered to be exactly one argument, unless it is "grouped" by using quotes. For example, the nested fields {date}{time} are considered to be two arguments: the result of the date field and the result of the time field. Whereas, the nested fields "{date}{time}"

are considered to be one argument-the concatenation of the date field and the result of the time field.

Except inside quotes or to separate arguments, white space characters are always ignored in field codes. Thus, a field could be formatted as:

```
{
    if appname = "Opus"
        "This is the true text."
        "This is the false text."
}
```

A field may contain one or more switches. A switch indicates that behavior other than the default is desired for this field. System switches are defined for all fields. In addition, a field type may specify its own switches.

A switch may be defined to take a switch argument. If so, the switch argument is immediately following the switch. A space between a switch and its switch argument that follows is optional. In one implementation, a field preferably can contain up to at least ten system and ten field specific switches. Additional switches will be ignored.

If a backslash character in the field codes is followed by a character that is not a valid switch identifier, that character is part of the argument. For example, the field {quote\q\\foo\b\"} has one argument q\foo"

assuming that q, \, b, and " are not valid switch identifiers. Inside quotes, the backslash character is stripped out and ignored. For instance, \\ results in \ and \" results in ".

The field codes of a field may contain hidden text. If the beginning field character ("{") is hidden, then the hidden text in the remainder of the field codes will be used when parsing the field codes. If the beginning field character is not hidden, then any hidden text within the field codes will not be used when parsing the field codes. This provides a means to annotate the field.

When displaying a file containing a field, the present invention determines the appropriate portion of the field to display according to whether the user has selected field code mode or result mode. During a generate operation, for each field in the text stream, the field processing algorithms of the present invention are invoked. The result of each field may be generated and updated in a user invoked update operation, whenever a file containing fields is printed, during a print merge operation, or during periodic automatic updates.

Typical field types and keywords are set forth in Table 1.

TABLE 1

1. Cross-Reference of text within document (REF)
2. Index Entry (XE)
3. Footnote reference cross reference (FTNREF)
4. Set bookmark to value (SET)
5. Conditional selection of text (IF)
6. Index generation (INDEX)
7. Table of contents entry (TC)
8. Last text of style cross reference (STYLEREF)
9. Referred-to-document for Index and TOC (RD)
10. User defined sequence and sequence cross reference (SEQ)
11. Table of Contents and Tables of other things (TOC)
12. Document Information (INFO) (see fields that follow)
13. Document Title (TITLE and INFO TITLE)
14. Document Subject (SUBJECT and INFO SUBJECT)
15. Document Author (AUTHOR and INFO AUTHOR)
16. Document Keywords (KEYWORDS and INFO KEYWORDS)
17. Document Comments (COMMENTS and INFO COMMENTS)
18. Document last saved by (LASTSAVEDBY and INFO LASTSAVEDBY)
19. Document create date (CREATEDATE and INFO CREATEDATE)
20. Document last saved date (SAVEDATE and INFO SAVEDATE)
21. Document last print date (PRINTDATE and INFO PRINTDATE)
22. Document revision number (REVNUM and INFO REVNUM)
23. Document edit time (EDITTIME and INFO EDITTIME)
24. Number of pages in doc (NUMPAGES and INFO NUMPAGES)
25. Number of words in doc (NUMWORDS and INFO NUMWORDS)
26. Number of characters in doc (NUMCHARS and INFO NUMCHARS)
27. Name of document file (FILENAME and INFO FILENAME)
28. Name of document template (TEMPLATE and INFO TEMPLATE)
29. Current date (DATE)
30. Current time (TIME)
31. Page number (PAGE)
32. Mathematical Expression (calculated value) (=)
33. Copy argument to result (QUOTE)
34. Include separate document (INCLUDE)
35. Page number cross reference (PAGEREF)
36. Ask for user data (set to bookmark) (ASK)
37. Ask for user data (place in result) (FILLIN)
38. Data file for Print Merge (DATA)
39. Invoke next record for Print Merge (NEXT)
40. Conditionally invoke next record for Print Merge (NEXTIF)
41. Conditionally skip current record for Print Merge (SKIPIF)
42. Dynamic Data Exchange to other app (DDE)
43. Hot DDE Link (DDEHOT)
44. Expand glossary (retaining link to glossary) (GLOSSARY)

Figure 1B:
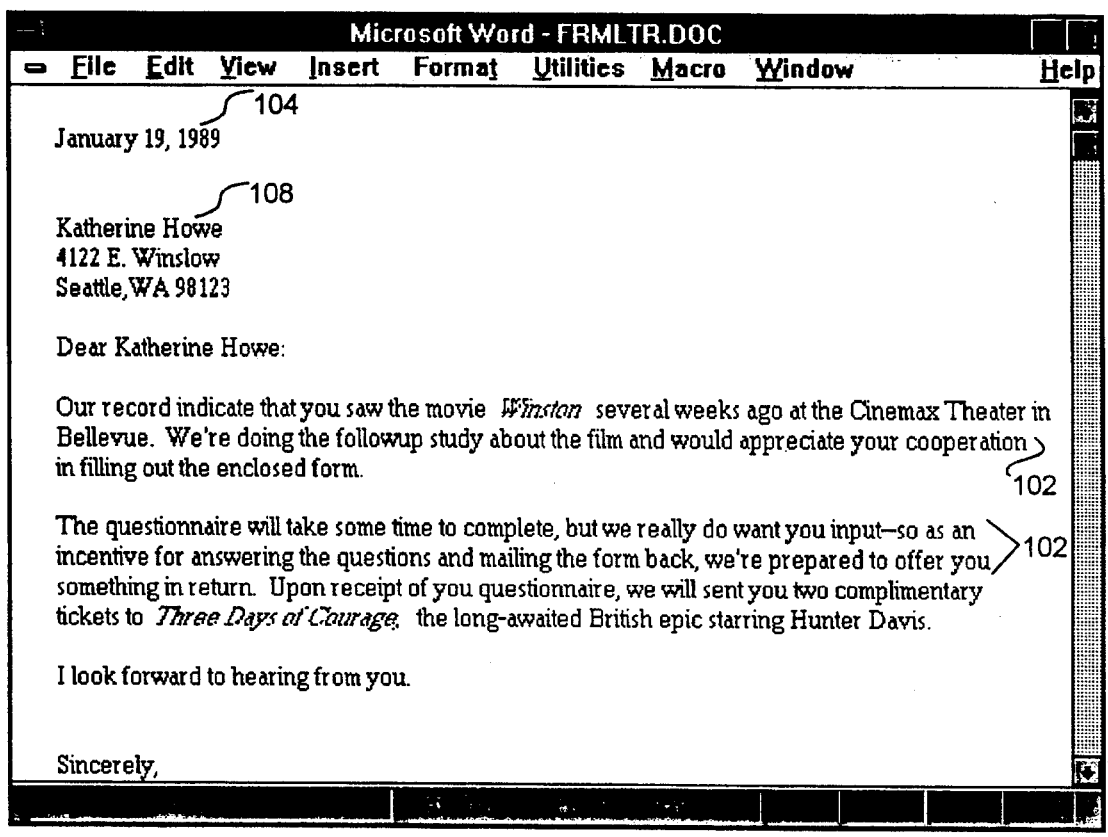

A display showing the field mechanism of the present invention is shown in FIGS. 1A and 1B. A document may include conventional text strings 102 and fields 104, 106, and 108. The fields may provide any of a number of predefined functions and be positioned in any location. For example, field 104 is a data field, field 106 is a field for inserting a title (e.g., Mr.), and field 108 is a field for inserting a last name. In FIG. 1A, fields are shown in the field code mode. In FIG. 1B, fields are shown in the result mode.

Figure 5:
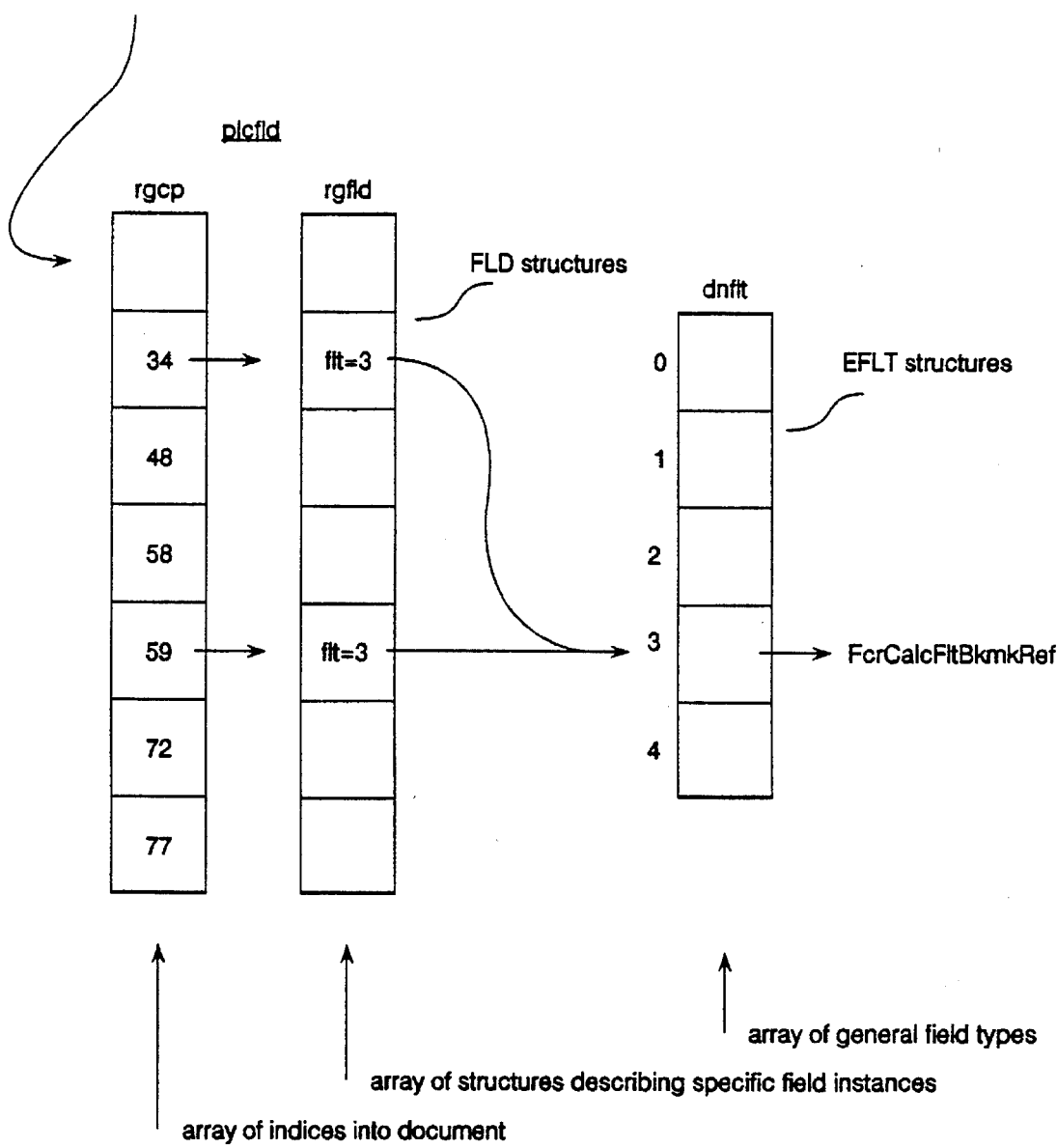
FIG. 5 is a diagram showing the organization of the data structures used to implement the present invention.

FIG. 5 shows data structures of a preferred embodiment of the present invention. Each character in a document has a character position (cp), which is the character offset within the document. As shown in FIG. 5, the beginning field character for the first field shown has a cp of 34, the separator character has a cp of 48, and the ending field character has a cp of 58. The data structure plcfld contains two parallel arrays: rgcp and rgfld. The array rgcp contains an entry for each beginning field character, separator character, and ending field character in the document. The entries contain the cp of the corresponding character. The entries are preferably maintained in sorted order during document generation. The array rgfld contains an entry corresponding to each entry in the array rgcp. The rgfld entries are an FLD data structure as described below. The FLD data structure contains the variables ch, flt, fDiffer, and flocked. The variable ch indicates whether the corresponding entry in the rgcp points to a beginning field character, a field separator, or an ending field character. The variable flt indicates the field type. The variable fDiffer indicates that the result of the field is to be displayed in the mode that is different than the global mode setting. The variable flocked indicates that the field is locked, which indicates that the result for the field is not to be regenerated. FIG. 5 also shows array dnflt. Array dnflt contains an entry for each field type, that is, keyword that is defined. The dnflt entries are EFLT data structures that contain the constants fResult, frm, and pfnCalcFunc. The constant fResult indicates that the field type produces a result. The constant frm is a refresh mask that indicates when the field type is to have a result generated. The constant pfnCalcFunc contains a pointer to the routine that generates the result for the field type. The variable flt in the array rgfld is an index into the array dnflt.

FIG. 5 shows two fields that are in the document. The first field starts at character position 34. The second field starts at character position 60. As shown, array rgcp contains six entries corresponding to the beginning field characters, the field separators, and the ending field characters for these two fields. Array rgfld contains six corresponding entries. The entries corresponding to the beginning field characters contain the variable flt set to indicate the field type. In this example, both fields have the keyword "ref"; thus the variable flt in both rgfld entries is set to three. Entry number three in array dnflt corresponds to the "ref" field type and the constant pfnCalcFunc contains a pointer to the routine FcrCalcFltBkmkRef, which generates the result for a "ref" field.

TABLE 2

/*CP is a long describing a character position in the document*/
/*BOOL is a boolean flag*/
/* A plc is a structure containing an array of cp's and an array of objects (in this case fld's) in which the index to the array serves as the link between the two pieces of Information. A handle to

TABLE 2-continued

```
the plcfld is stored In the document descriptor. The plcfld itself is stored in the file format.*/
/* Information stored in plcfld for each field character*/
struct FLD
    {/* FIELD Descriptor*/
    struct
        {
        int ch : 7; /*chFieldBegin, chFieldSeparate or chFieldEnd*/
        int fDirty : 1; /*field must be reparsed*/
        };
        union
        {
        char flt; /*chFieldBegin:FIELD Type*/
        char bData; /*chFieldSeparate: field-specific
        cached data*/
        struct
            { /*chFieldEnd*/
            int fDiffer : 1; /*this field in ! show
        results mode*/
            int : 1;
            int fLocked : 1; /*this field is locked
            from recalc*/
            int fNested : 1; /*field is nested within
            another field*/
            int : 4; /*spare*/
            };
        char grpf; /*chFieldEnd: GRouP of bit Flags*/
        };
    };
/*Used to cache information about a field.
Constructed from the info in the two or three fld's corresponding to the field.*/
struct FLCD
    {/* FIELD Composite Descriptor*/
    CP cpFirst; /*cp where field begins*/
    CP dcpInst; /*Includes both {} and all field codes*/
    CP dcpResult; /*Includes | and all result text*/
    BOOL fDirty; /*field is dirty and must be reparsed*/
    int flt; /*field's type*/
    int bData; /*flt specific cached data*/
    int ifldChBegin;
    int ifldChSeparate;
    int ifldChEnd;
    union
        {
        struct
            {
            intfDiffer : 1; /*this field in ! show results mode*/
            int : 1;
            int fLocked : 1; /*this field is locked from recalc*/
            int fNested : 1; /*field is nested within another field*/
            int : 4; /*spare*/
            };
        int grpf : 8;
        };
    };
/*This structure provides general information about a specific field type*/
struct EFLT
    { /*Element of dnflt, an array of the info below for each field type. flt is the index into
this array*/
    int fResult : 1; /*this field may have a result*/
    int : 4; /*spare*/
    int : 1; /*spare*/
    int frm : 8; /*refresh time mask*/
    PFN pfnCalcFunc; /*pointer to recalc function*/
    };
/*this is used to map ich's to cp's*/
struct CR
    { /*CP Run*/
    CP cp;
    int ccp;
    };
/*holds information about switches found during a fetch*/
struct FSF
    { /*Field Switch Fetched*/
    int c; /*how many were fetched*/
    CHAR rgch [cSwitchMax]; /*the switches themselves*/
    CP rgcpSw [cSwitchMax]; /*cp of the switches*/
    CP rgcp [cSwitchMax]; /*cpNil or the cp of the switch's arg*/
    };
/*this is used by FetchFromField and functions that call it*/
```

TABLE 2-continued

```
struct FFB
   { /*Field Fetch Block*/
   union
      {
      /*this is used also by FetchVisibleRgch*/
      struct FVB
      { /*Fetch Visible Block*/
         int doc; /*document fetching from*/
         CP cpFirst; /*first cp to fetch in next fetch (modified)*/
         CP cLim; /*limit of fetches*/
         int cch; /*number of ch's read if rgch. under if !rgch*/
         int ccr; /*number of cr's corresponding to ch's read*/
         union
            {
            struct FBB
               { /*Fetch Block Buffers*/
               int cchMax; /*max number of ch to place in rgch*/
               CHAR *rgch; /*buffer in which to place chars*/
               int ccrMax; /*max number of cr's to place in rgcr*/
               struct CR *rgcr;/*buffer in which to place cp runs*/
               };
            struct FBB fbb;
            };
         BOOL fOverflow; /*fetch overflowed cchMax or ccrMax, fetch again*/
         };
      struct FVB fvb;
      };
   union
      {
      struct FSFB
         { /*Field Specific Fetch Block*/
         CP cpField; /*cpFirst of the field being fetched from*/
         /*inputs*/
         int flt; /*what flt is the field being fetched*/
         int foc; /*how to treat fetch options*/
         /*outputs*/
         BOOL fGrouped; /*indicates returned argument was grouped*/
         BOOL fNested; /*fetched data contained fields*/
         BOOL fNoArg; /*there was no argument fetched*/
         /*state (be very careful modifying)*/
         int cchFieldBegin; /*count of chfieldBegin's to be matched*/
         BOOL fGroupPending; /*indicates inside chGroupExternal pair*/
         struct FSF fsfFlt; /*flt specific switches found*/
         struct FSF fsfSys; /*system switches found*/
         };
      struct FSFB fsfb;
      };
   ;
/*stores information about all defined field switches*/
struct FSI
   { /*Field Switch Information*/
   int ch : 7; /*the switch character, note: packed to 7 bits*/
   int fArg : 1; /*switch expects an argument*/
   int flt : 8; /*what flt does this switch apply to*/
   };
```

Figure 2:
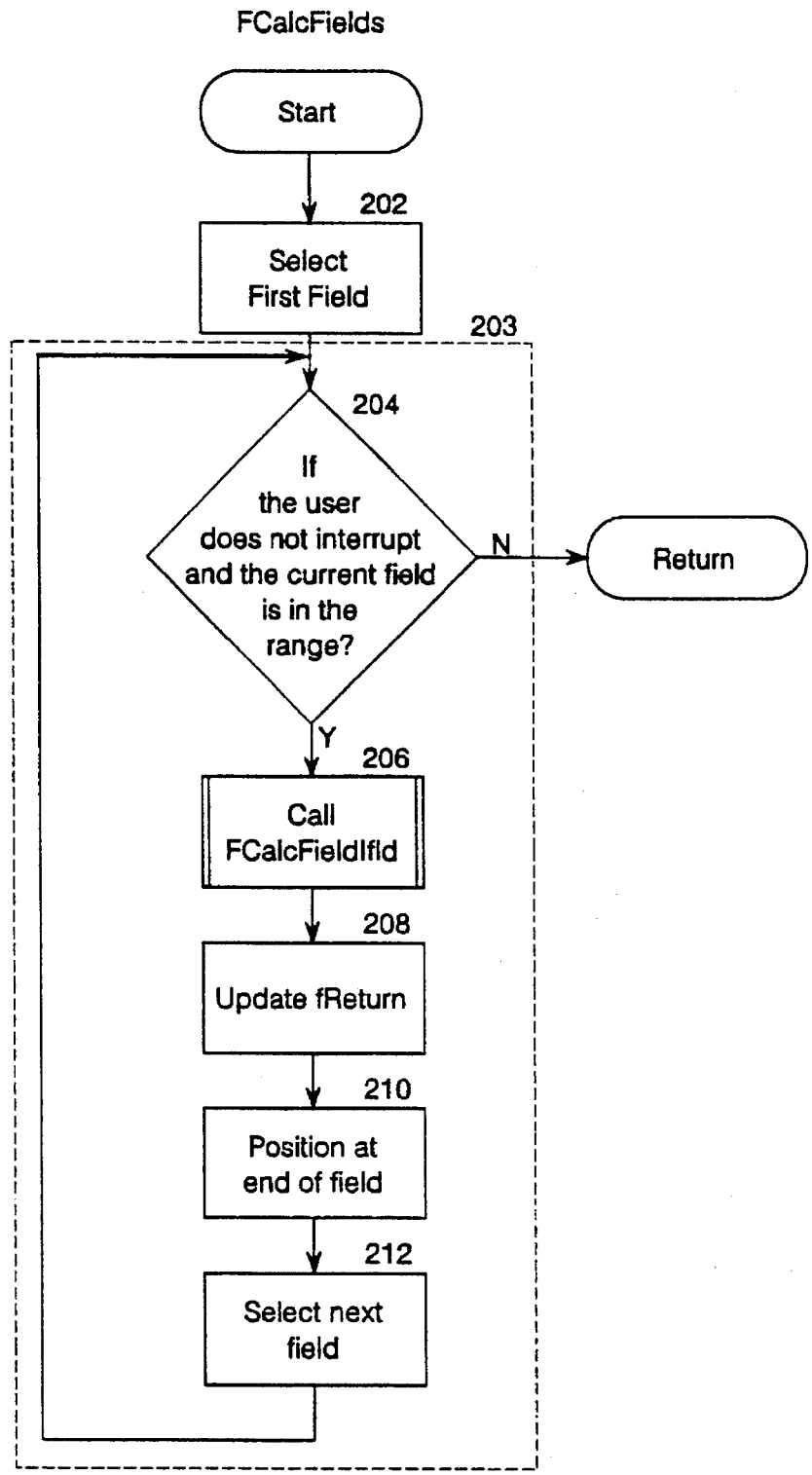
FIG. 2 is a flow diagram of the FCalcFields routine used to update a field whenever invoked manually by the user or automatically by the system.

The generic field handling mechanism of the present invention comprises two main components: routines for generating field results and routines for displaying fields. Referring now to FIG. 2, the FCalcFields routine is invoked by a user or is invoked automatically by the system to regenerate field results of a document within a specific range. Specifically, the routine FCalcFields is invoked when a user requests regeneration of fields, during the initial layout of headers, during print, page view and print preview operations, during print merge operations, whenever a document is opened, and whenever a new document is created based on a template that contains fields. The routine FCalcFields is passed as arguments the pointer pca and the variable frm. The pointer pca points to a structure containing a document and a range of character positions. The variable frm is a refresh mask, which indicates what action caused the results generation to be invoked. The routine FCalcFields returns the flag fReturn, which indicates the success or failure of the update operation.

When routine FCalcFields is invoked, item 202 selects the first field in the range to be regenerated. The system then enters loop 203 where fields are processed while (i) the process is not interrupted and (ii) the selected field is within the range of fields to be regenerated. Decision 204 tests whether the looping conditions are satisfied. If not satisfied, the routine returns with the flag fReturn. Otherwise, item 206 invokes routine FCalcFieldIfld to generate the result of the selected field. Item 208 sets flag fReturn to the logical-OR of flag fReturn and the value returned by routine FCalcFieldIfld. Item 210 positions the routine at the end of the selected field in preparation for selection of the next field, and item 212 selects the next field and loops to decision 204 to process the next field.

Figure 3:
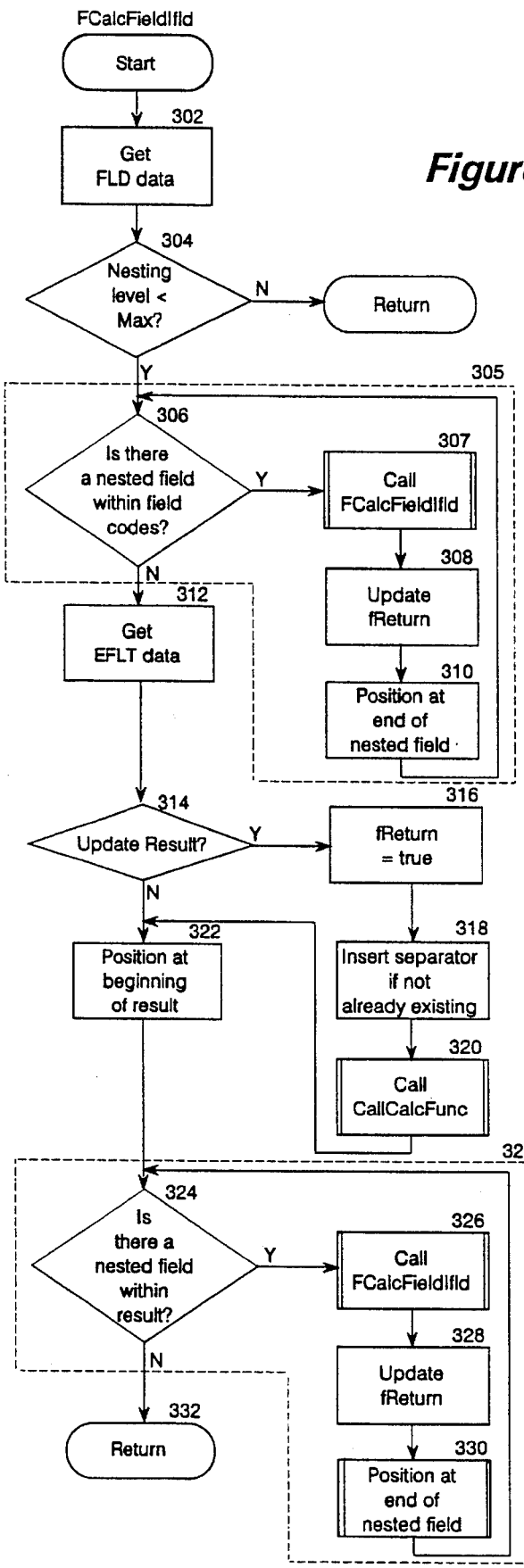
FIG. 3 is a flow diagram of the FCalcFieldIfld routine used to generate the result of a field.

Referring now to FIG. 3, the routine FCalcFieldIfld is invoked to generate the result of a field. Routine FCalcFieldIfld receives as arguments a pointer to the current document, the index ifld into the array rgcp, the variable frm, and the variable cNestLevel, which is a count of nested levels. The index ifld contains the index into the plcfld data structure of the beginning field character of the field to have its result generated, referred to as the current field. Flag fReturn is returned by routine FCalcFieldIfld. Item 302 retrieves the FLD data from array rgfld for the current field. Decision 304 then determines whether the current nesting level indicated by the variable cNestLevel is equal to the maximum nesting level to ensure the nesting level does not exceed the nesting limit. If the maximum nesting level is exceeded, the routine returns. If the nesting level is less than the maximum, the routine enters loop 305, which calls routine FCalcFieldIfld recursively to generate the result for the nested fields in the field codes portion of the current field. Decision 306 determines whether a field that has not yet been processed exists within the range of field codes for the current field. If such a field does not exist, control passes to item 312. Otherwise, item 307 calls routine FCalcFieldIfld recursively to generate the result of the nested field. Item 308 sets the flag fReturn equal to the logical-OR of flag fReturn and the value returned from the call to routine FCalcFieldIfld. Item 310 positions the routine at the end of the nested field and loops to decision 306 to process the next field within the range of field codes of the current field. Item 312 uses the variable flt in the retrieved FLD data for the current field to retrieve the EFLT data from array dnflt for the field type of the current field. Decision 314 determines whether the result of the field should be regenerated based on the value in variable frm in the EFLT data and the passed variable frm, and the flag flocked in the FLD data. If the flag flocked is set, then the field is locked and the result will not be regenerated. A field is locked under user control. If the result is not to be regenerated, control passes to item 322. Otherwise, item 316 sets the value of flag fReturn to true and item 318 inserts a separator character in the current field if one is not already in the current field. Item 320 invokes routine CallCalcFunc to generate the result and to insert the result in the current field just after the separator character and just before the old result, if present. Item 322 positions the routine at the beginning of the result of the current field. The routine then enters loop 323, which recursively invokes routine FCalcFieldIfld to generate the results for all nested fields within the result portion of the current field. When loop 323 is entered, decision 324 determines whether the result is locked or whether a field that has not yet been processed exists within the range of the result portion of the current field. A locked result indicates that fields which are part of the result are not updated. If the result is locked or such a field does not exist, control passes to item 332. Otherwise, item 326 recursively invokes routine FCalcFieldIfld to generate the result of the nested field. Item 328 sets the flag fReturn equal to the logical-OR of flag fReturn and the value returned from the call to routine FCalcFieldIfld. Item 330 positions the routine at the end of the nested field and loops to decision 324. Item 332 returns with the value of flag fReturn.

Figure 4:
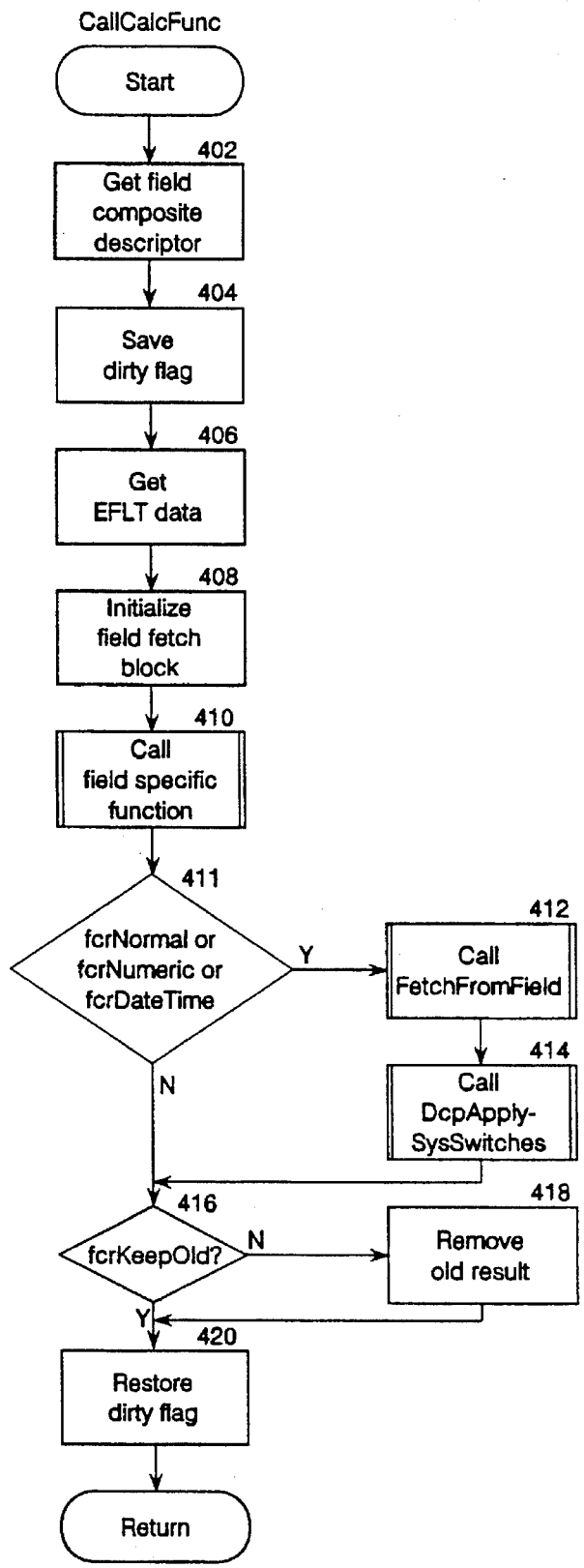
FIG. 4 is a flow diagram of the CallCalcFunc routine called by the routine of FIG. 3.

Referring now to FIG. 4, the routine CallCalcFunc is invoked to perform field specific functions and to fetch and apply switches. Item 402 initializes composite field descriptor information in the FLCD data structure. The FLCD data structure contains data derived from the entries associated with the current field in the data structure plcfld. Item 404 saves flag fDirty that indicates the field codes of the current field may have been edited. This flag is set by the document processor when the field codes are modified. The routines that perform the field-specific generating may modify this flag. Item 406 fetches the field type characteristics, the EFLT data, from the array dnflt based on the variable flt in the data structure plcfld. Item 408 initializes the field fetch block. The field fetch block (FFB) is a data structure that stores the state of the fetching of the arguments of a field. The field fetch block is initialized to point to the first character in the current field (cpFirst) and the character after the ending field character of the current field (cpLim). As arguments are fetched, the field fetch block is updated. Also, the data structure FieldSwitchFetched (FSF) is updated with the field switches as arguments are fetched. Item 410 calls the field specific function through the pointer pfnCalcFunc in the EFLT data. The field specific function generates a new result, inserts it in the document in front of the old result, and returns a value fcr which indicates the degree of success or failure. The field specific function may invoke the routine FetchFromField to fetch the field arguments and as those arguments are fetched, any switches encountered are stored in the FSF data structure. The return values are fcrKeepOld (process failed, keep old result), fcrError (process failed or an error occurred), fcrNormal (process succeeded), fcrNumeric (process succeeded, numeric result was generated) or fcrDateTime (process succeeded, a date/time result was generated). Decision 411 determines whether fcrNormal, fcrNumeric, or fcrDateTime was returned. If fcrNormal, fcrNumeric, or fcrDateTime was not returned control passes to decision 416. Otherwise, item 412 calls routine FetchFromField to ensure that all switches in the field codes have been stored in the FSF data structure, and item 414 calls DcpApplySysSwitches to apply the switches. Decision 416 determines whether fcrKeepOld was returned (indicating the old result is to be retained). If the old result is to be kept, the routine continues at item 420. Otherwise, item 418 removes the old result from the field and the routine continues at item 420. Item 420 restores the flag fDirty and the routine returns.

The routine FetchFromField is invoked to parse the field codes of a particular field into arguments and switches and then return the text of those arguments. The routine FetchFromField receives as an argument the variable designated pffb, which is a pointer to a field fetch block (FFB) data structure. The FFB is passed with values to indicate what field is being fetched from and how far the fetch process has progressed. The FFB contains a pointer to a character buffer which is to receive the output of this routine. Routine FetchFromField scans the field codes and returns in the character buffer the text of the next argument in the field codes. This routine updates the FFB structure so that a subsequent call to routine FetchFromField with the same FFB structure will fetch the argument following the argument just fetched.

Also, the FFB contains two FSF data structures, fsfFlt and fsfSys. These data structures cache information about each of the switches seen by FetchFromField during normal operation. Routine ChFetchSwitch is invoked to return these cached switches.

In a preferred embodiment, routine FetchFromField acts as a state machine, which means that as it scans characters, it sets a flag or a count to change its state. The manner in which different characters in field codes are treated by FetchFromField are dependent on the state of these variables. In a preferred embodiment, the state variables include: fChFieldPreceding which indicates that that previous character looked at by FetchFromField was a beginning field character; and fChEscapePreceding which indicates that the previous character looked at by FetchFromField was a backslash character ('\'). The variable cchFieldBegin contains the nesting level of fields within the field codes (every time a beginning field character is encountered, a field is nested within the field code portion of the current field, FetchFromField increments cchFieldBegin and jumps to the results of the field just encountered. When the ending field FieldEnd character is encountered cchFieldBegin is decremented. The variable fGroupPending indicates that the current text being fetched was preceded by a quote character. All the text that follows until the next quote character will be grouped into a single argument.

The FFB structure is initially set up by the caller with cpFirst containing the character position of the first character of the field codes and cpLim containing the character position of the character following the last character of the field codes. As arguments are fetched using FetchFromField, cpFirst is advanced to indicate the new starting location and cpLim is used to determine when to stop fetching.

Figure 6:
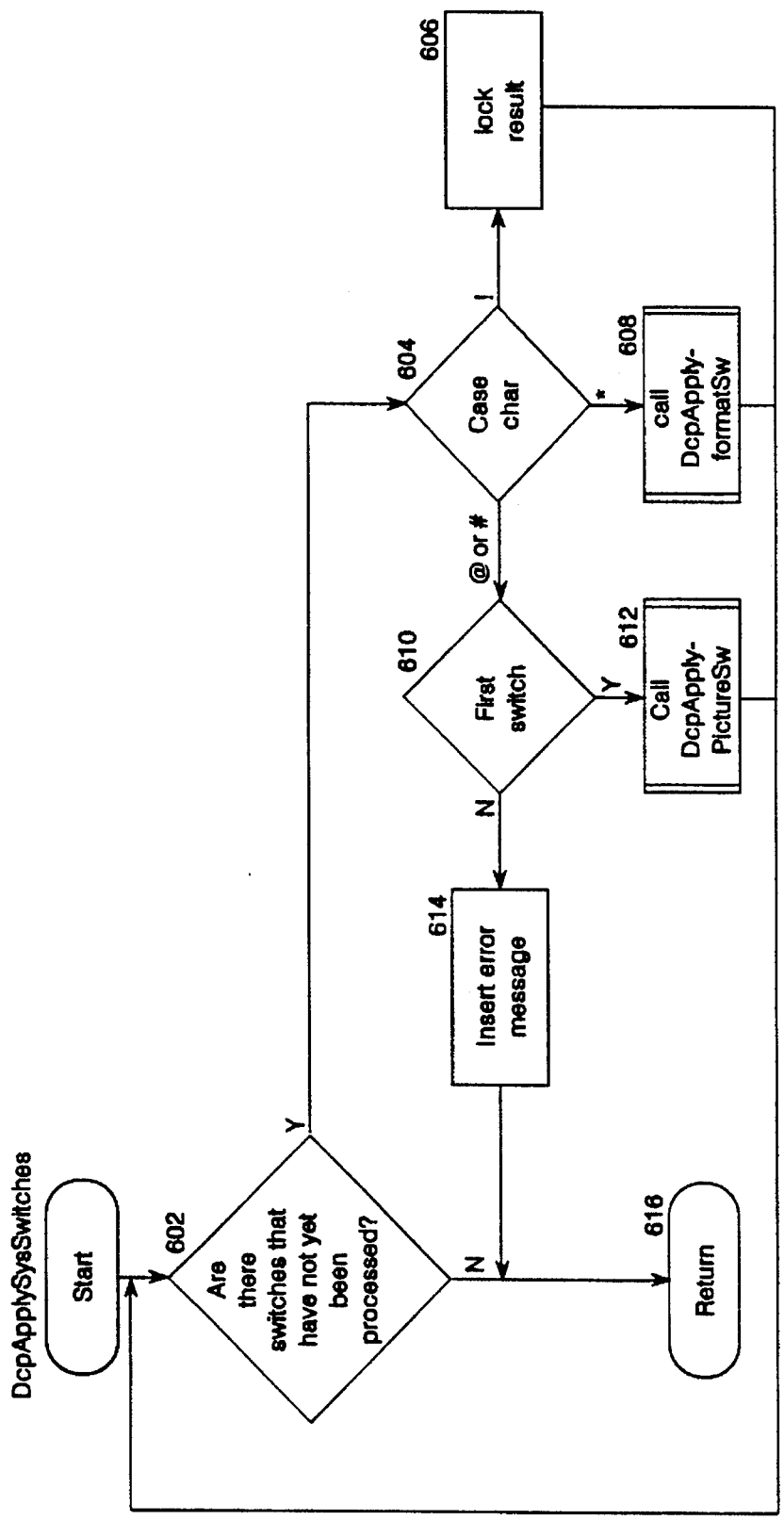
FIG. 6 is a flow diagram of the DcpApplySysSwitches routine called by the routine of FIG. 4.

Referring now to FIG. 6, the routine DcpApplySysSwitches is invoked to apply system switches to field results. The routine receives as arguments a pointer pffb (pointer to the field fetch block), the current document, a value designated cpResult (a result character position), a value designated dcpNew (the number of character positions of the new result), a value dcpPrev (the number of character positions of the old result), and a value fcr (the return value of a field specific generation function). The routine returns the value dcpNew (the length in characters of a new result) and the FFB modified. When routine DcpApplySysSwitches is invoked, item 602 calls routine ChFetchSwitch to determine whether all the system switches have been processed and returns the switch identifier. Routine ChFetchSwitch is described below. If all the switches have been processed, routine DcpApplySysSwitches returns. Otherwise, item 604 determines which switch identifier is currently being processed. If the current switch identifier is a "@" or "#" character (corresponding to a date/time or numeric switch), control passes to decision 610 which determines whether this is the first date/time, numeric, or formatting switch for the field. If not the first, a rule violation has occurred and item 614 outputs an error message in the result and routine DcpApplySysSwitches returns. Otherwise, item 612 invokes the routine DcpApplyPictureSw (discussed below) to apply the picture switch and to update dcpNew, and then loops to decision 602. If decision 604 indicates that the current switch identifier is a "*" character (corresponding to a formatting switch), then item 608 invokes routine DcpApplyFormatSw to apply the format switch and to update dcpNew, and then loops to decision 602 to process the next switch. If decision 604 indicates that the current switch identifier is a "!" character, item 606 locks the result, which indicates that the fields in the result will not be updated, and loops to decision 602 to process the next switch.

Figure 7:
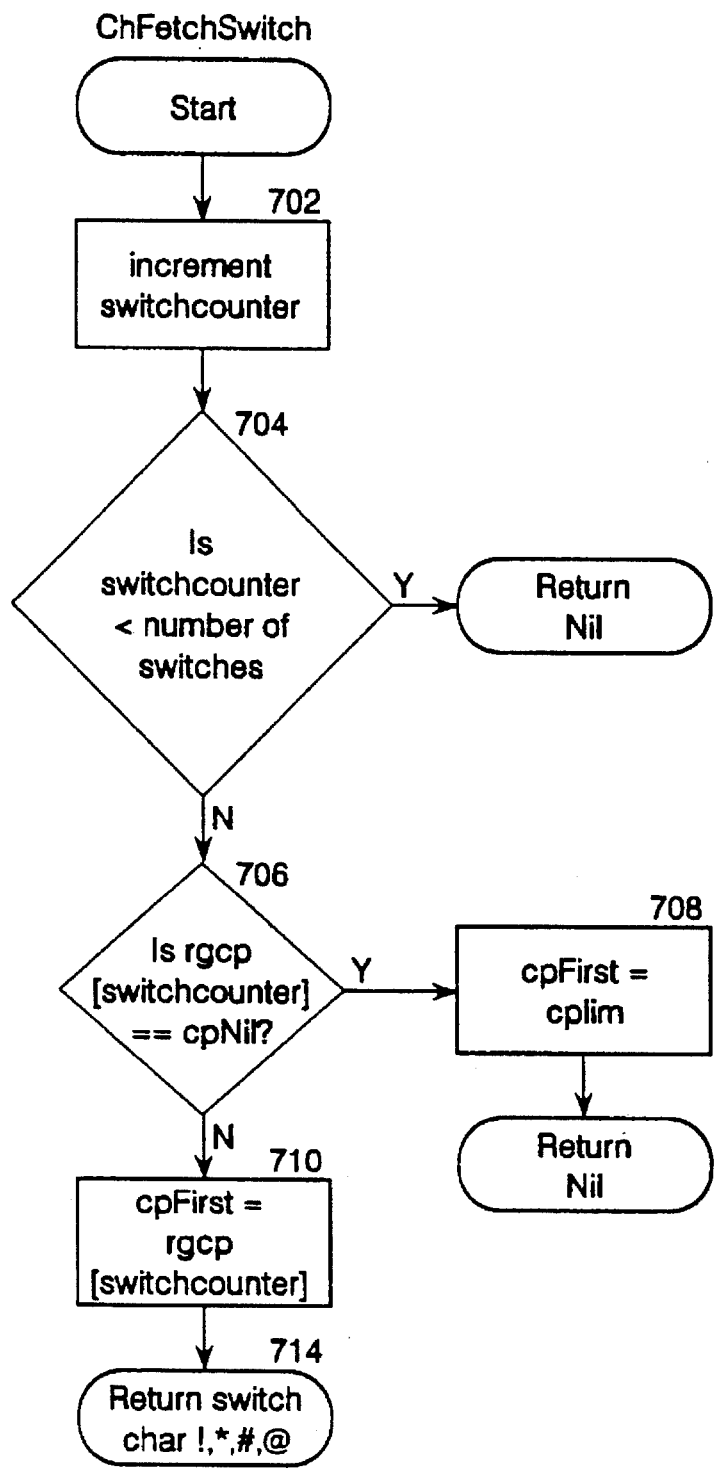
FIG. 7 is a flow diagram of the ChFetchSwitch routine.

Referring now to FIG. 7, the routine ChFetchSwitch is shown. The routine ChFetchSwitch is invoked to fetch switches from the FFB data structure and to set up arguments for fetching. It receives as arguments the pointer pffb that points to the FFB data structure and returns a switch identifier and the FFB data structure modified. When routine ChFetchSwitch is invoked, item 702 increments the switch counter in the FFB. Decision 704 then determines whether the switch counter is less than the total count of switches stored in the FFB. The total count of switches was set by routine FetchFromField. If not less than, then the routine returns indicating no more switches to process. Otherwise, a switch has not yet been fetched and decision 706 determines whether the character position of the switch's argument, rgcp[switch counter] of the FSF data structure in the FFB, is equal to cpNil, which indicates that the switch has no argument. If equal to cpNil, item 708 sets the value of cpFirst in the FFB to the value of cpLim so that the fetch operation (FetchFromField) will do nothing when next called and the routine returns. Otherwise, item 710 sets cpFirst to the beginning character position of the switch argument. Item 714 gets the switch identifier (*,! ,@ or #) stored in the array element rgch[switch counter] and the routine returns.

Figure 8:
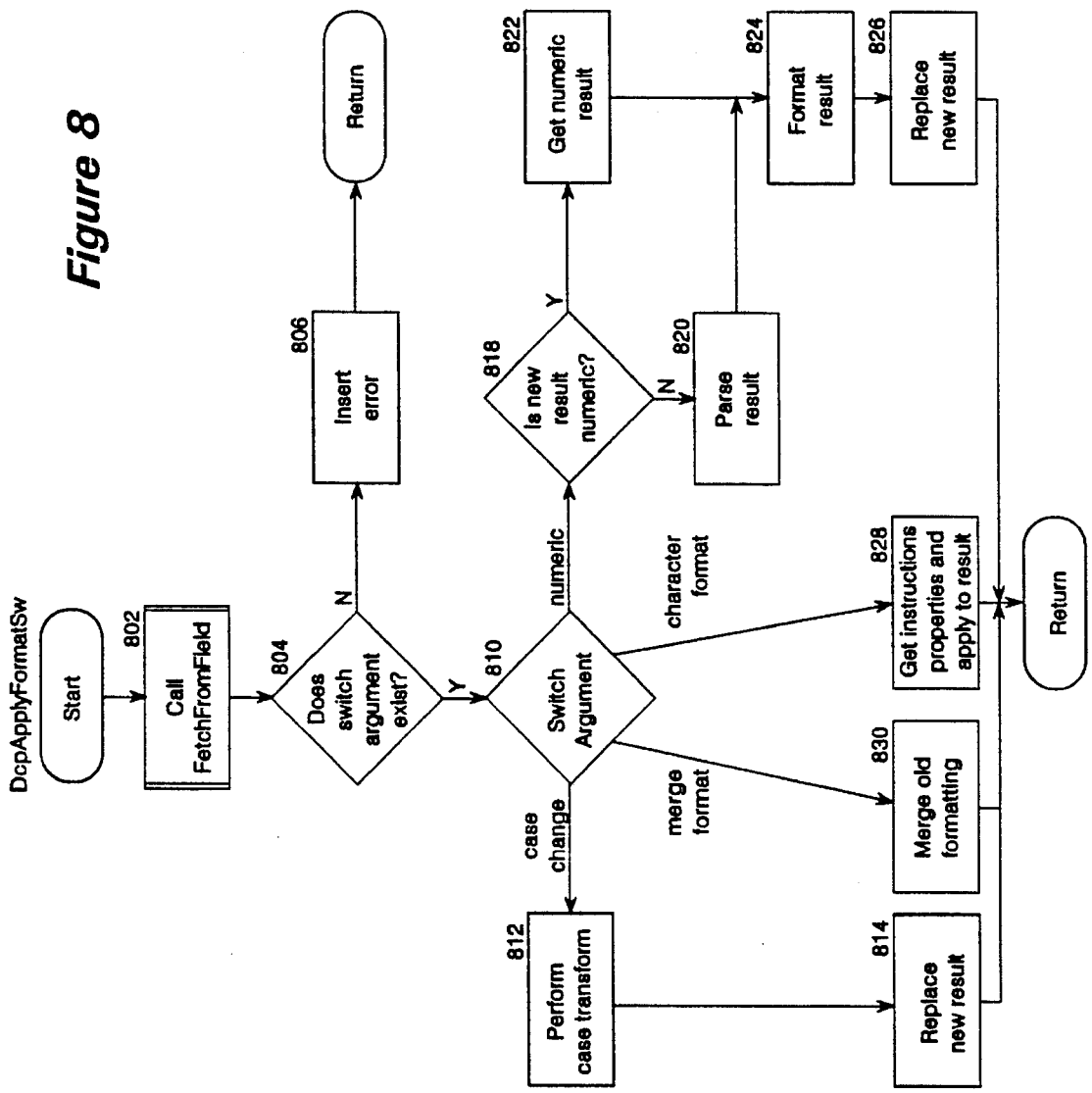
FIG. 8 is a flow diagram of the DcpApplyFormatSw routine called by the routine of FIG. 6.

Referring now to FIG. 8, the routine DcpApplyFormatSw is invoked to apply formatting switches. Routine DcpApplyFormatSw receives as arguments the pointer pffb to the field fetch block, the document, the variable cpResult (the character position of the result in the field), the variable dcpNew (the number of character positions of the new result), the variable dcpPrev (the number of character positions occupied by the old result), and the variable fcr (the return value of the field specific generation function). The routine returns a new value of dcpNew which corresponds to the length of the new result. When routine DcpApplyFormatSw is invoked, item 802 fetches the switch argument by calling routine FetchFromField. Decision 804 then determines whether a switch argument exists for the current switch. If none exists, item 806 inserts an error message into the result and the routine returns. Otherwise, decision 810 evaluates the switch argument. If the switch argument is a case change, item 812 transforms the case of the new result, item 814 replaces the new result with the transformed result, and the routine returns. If the switch argument is numeric formatting, decision 818 determines whether the new result is numeric by testing whether flag fcr indicates numeric. If not, control passes to item 820 to parse the new result to extract a numeric value and then control passes to item 824. Otherwise, control passes to item 822 to retrieve the numeric value from the new result. Item 824 then formats the numeric value, and item 826 replaces the new result with the formatted result and the routine returns with the updated dcpNew. If the switch argument is a character format, item 828 fetches the format of the first character in the field, applies it to the new result, and the routine returns. If the switch argument is a merge format, item 830 merges the character formatting of the old result with the new result on a word-by-word basis and the routine returns.

Figure 9:
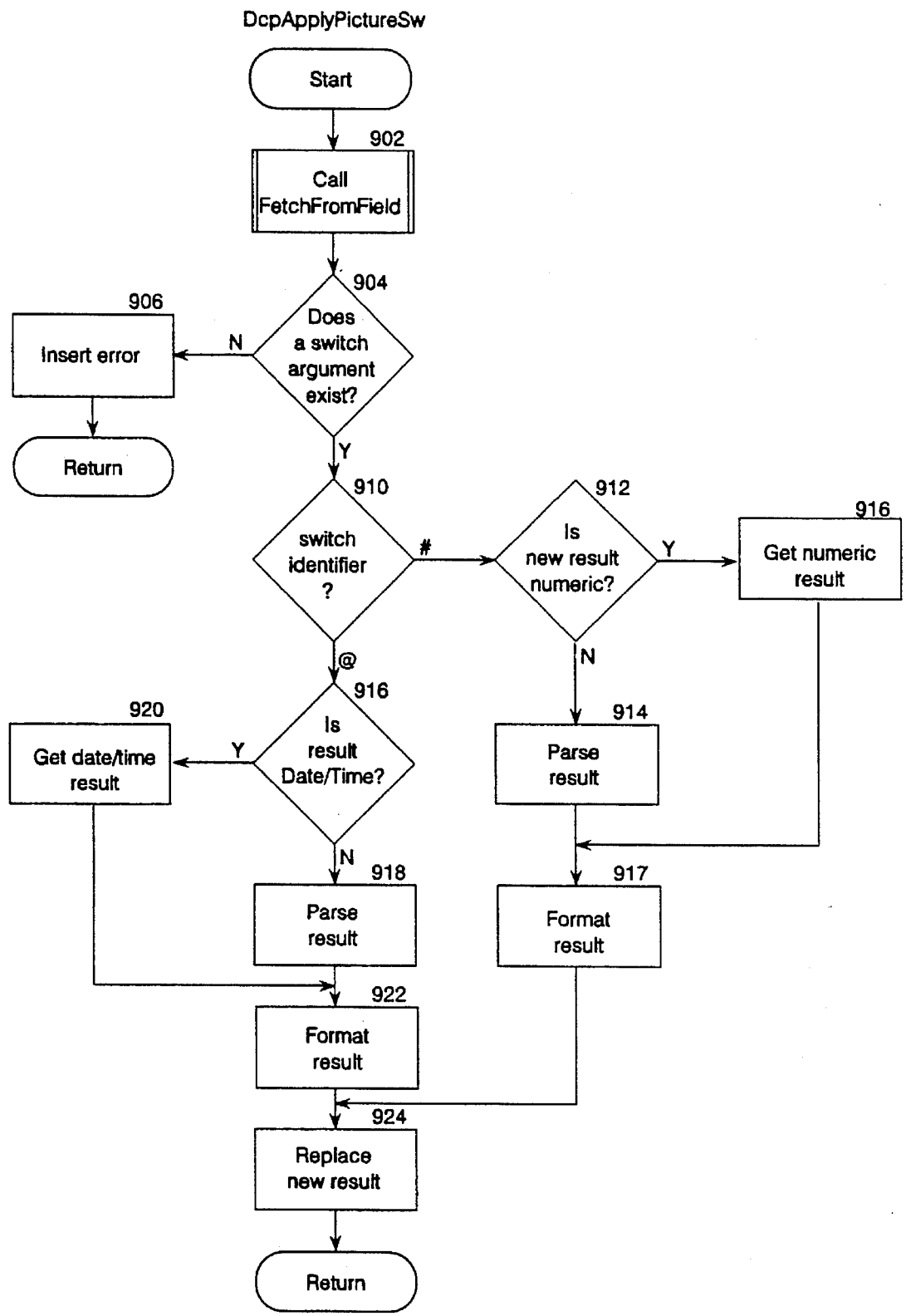
FIG. 9 is a flow diagram of the DcpApplyPictureSw routine called by the routine of FIG. 6.

Referring now to FIG. 9, the DcpApplyPictureSw routine is invoked to apply number and date/time formatting. Routine DcpApplyPictureSw is called with the same parameters as described above for routine DcpApplyFormatSw plus the parameter switch identifier. When routine DcpApplyPictureSw is invoked, item 902 calls routine FetchFromField to fetch the switch argument for the current switch. Decision 904 then determines whether a switch argument exists. If a switch argument does not exist, item 906 inserts an error message in the result and the routine returns. Otherwise, control passes to item 910 which determines whether the switch identifier indicates numeric formatting or date/time formatting. If the switch identifier indicates date/time formatting, control passes to decision 916. If the switch identifier indicates numeric formatting, decision 912 determines whether the new result is numeric. If not numeric, control passes to item 914 which parses the new result to extract a numeric value and control passes to item 917. Otherwise, item 916 retrieves the numeric value from the new result and control passes to item 917. Item 917 formats the numeric value and control passes to item 924.

If the switch identifier indicates date/time formatting, decision 916 determines whether the new result is in date/time format. If not a date/time, item 918 parses the result to extract a date/time value, and control passes to item 922. Otherwise, item 920 retrieves the date/time value from the new result and control passes to item 922. Item 922 formats the date/time value. Once a value is formatted by item 917 or item 922, item 924 replaces the new result with formatted result and updates the variable dcpNew, and the routine returns.

Figure 10:
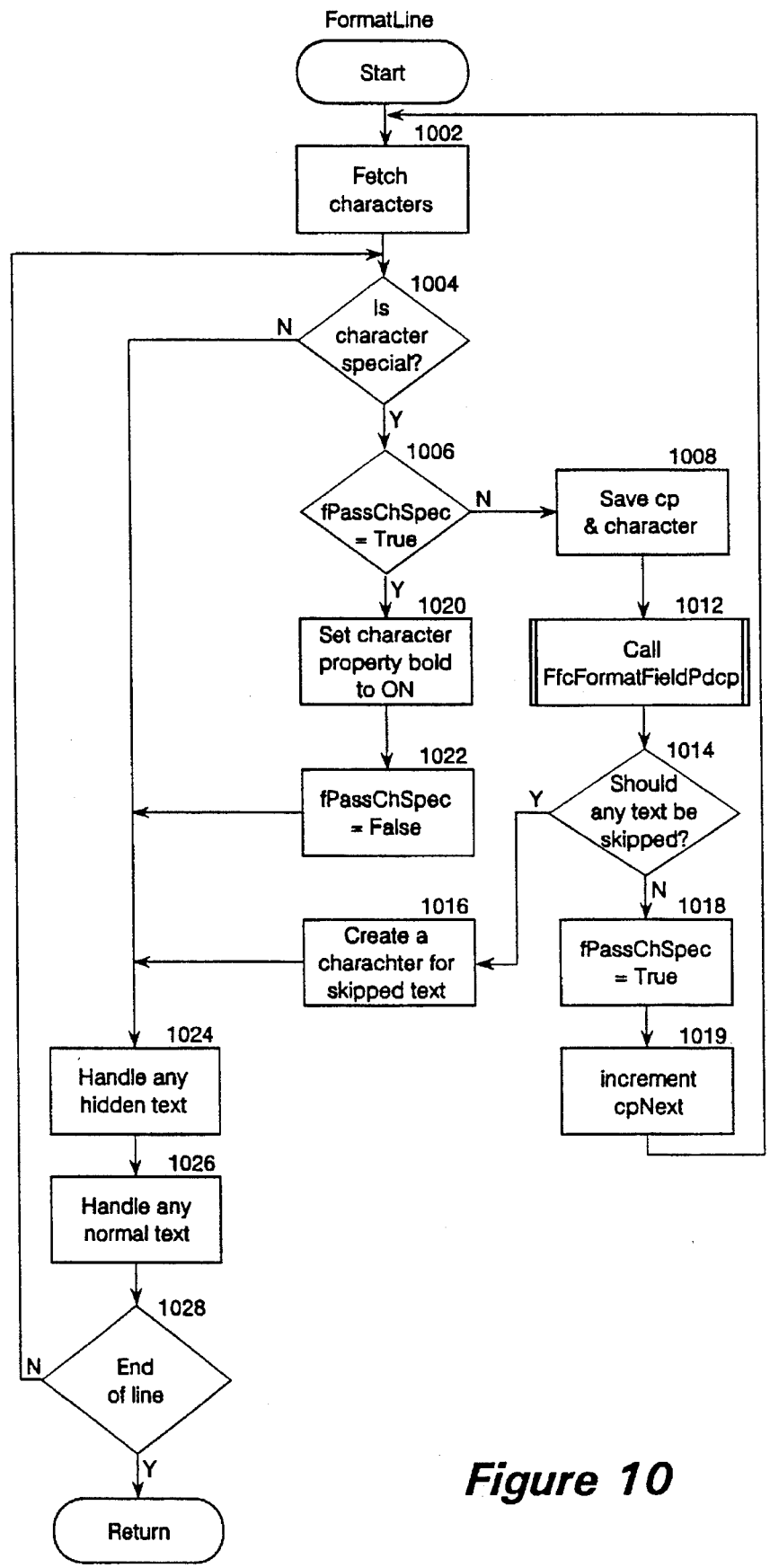
FIG. 10 is a flow diagram of the FormatLine routine used to update display devices while using the present invention.

The following routines are invoked for text display operations. Referring now to FIG. 10, the routine FormatLine is invoked to determine how many and which characters will be shown in a line of text. The routine FormatLine receives as arguments the variable ww which defines the current window, the document, the variable cp which defines the current character position, and the variable dxa which defines the width of a column of text. This routine returns grpchr which is a group of character runs and the variable vfli which is a format line structure containing the width of the line and an array of the characters to be included in the line. When routine FormatLine is invoked, item 1002 fetches a run of characters, that is, a group of adjacent characters with the same character properties, from the document starting with a character designated cpNext. Decision 1004 then retrieves the next character in the run and determines whether the character is a field beginning, ending or separator character. If not, control passes to item 1024. Otherwise, decision 1006 determines whether flag fPassChSpec is true, which indicates that the current character is to be displayed. If the current character is to be displayed, item 1020 sets the current character property to bold (so the user can distinguish between a bracket and a beginning field character), item 1022 sets the flag fPassChSpec to false, and control passes to item 1024. If the current character is not to be displayed, item 1008 saves the character position and the current character. Item 1012 gets the next character position to show by calling routine FfcFormatFieldPdcp (described below). Decision 1014 determines if routine FfcFormatFieldPdcp indicates that characters are to be skipped. If text is to be skipped, item 1016 creates a character for the skipped text and control passes to item 1024. Otherwise, item 1018 sets the variable fPassChSpec to true to indicate that the next character is to be displayed and item 1019 increments the character position by the number of characters to skip and the routine loops to item 1002 to process the next character run. Items 1024 and 1026 process any hidden and normal text. Decision 1028 then determines whether the end of the line has been reached. If so, the routine returns. Otherwise, control loops to item 1002.

Figure 11:
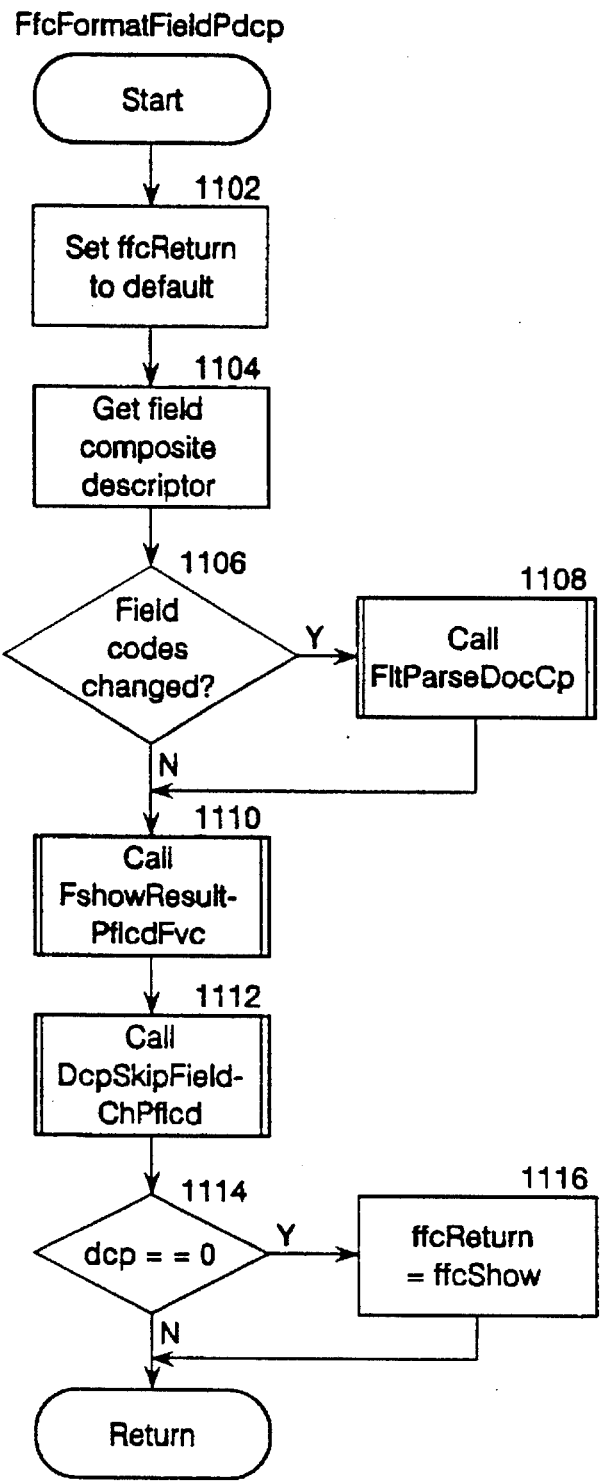
FIG. 11 is a flow diagram of the FfcFormatFieldPdcp routine called by the routine of FIG. 10.

Referring now to FIG. 11, the routine FfcFormatFieldPdcp is invoked to determine whether a portion of a field is to be displayed and the offset to the next character to be displayed. Routine FfcFormatFieldPdcp receives as arguments a variable designated pdcp which is a pointer to the offset of the next visible character, the current window, the current document, the character position variable cp, and the current character ch. The routine returns a value designated ffcReturn which is the field format code and the variable pdcp indicating how many characters to skip. When routine FfcFormatFieldPdcp is invoked, item 1102 sets the value of the field format code (ffcReturn) to a default value. Item 1104 then fetches the composite field descriptor for the current field. Decision 1106 then determines whether the field codes have changed by checking flag fDirty. If the field codes have changed, item 1108 parses the field type by calling routine FltParseDocCp. Item 1110 gets the display state for the field by calling routine FShowResultPflcdFvc, which returns the flag fShowResult set to true if the result is to be displayed. Item 1112 gets the character position offset to the next visible field by calling routine DcpSkipFieldChPflcd, which returns variable dcp to indicate the number of characters to skip. Decision 1114 determines the value of the current character position offset. If the value of the current offset is zero, the item 1116 sets the variable ffcReturn to indicate that the current character is to be displayed. The routine then returns.

Figure 12:
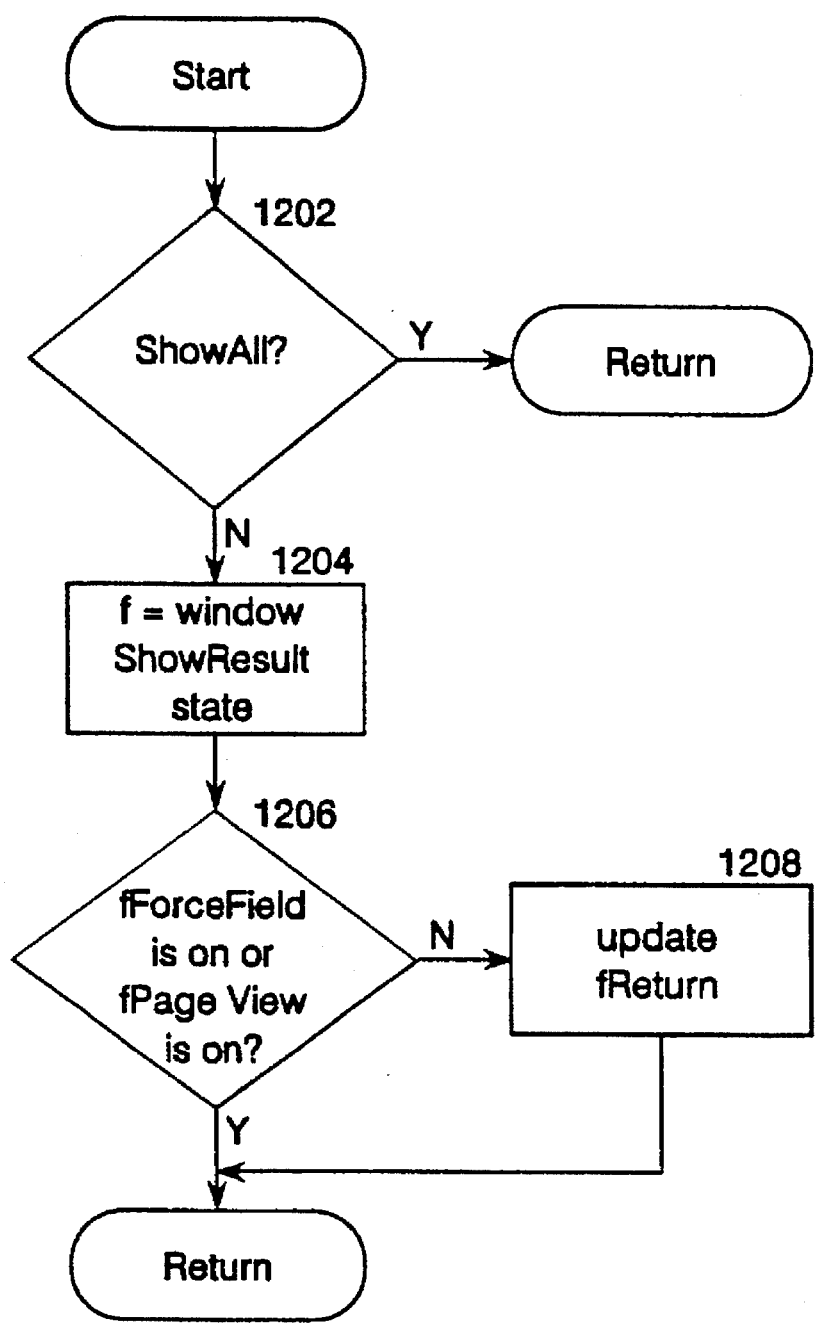
FIG. 12 is a flow diagram of the FShowResultPflcdFvc routine called by the routine of FIG. 11.

Referring now to FIG. 12, the routine FShowResultPflcdFvc is invoked to determine the ShowResult state for a single field. The routine receives as arguments the pointer pflcd to the composite field descriptor for the current field and the variable fvc which is a field visibility code. The routine returns a flag fReturn that indicates whether the current field should be shown in the result mode. When routine FShowResultPflcdFvc is invoked, decision 1202 determines whether the global variable ShowAll is set for the current window. If it is set, the routine returns with the flag fReturn set to false. Otherwise, item 1204 sets flag fReturn equal to the ShowResult state of the window. Decision 1206 then determines whether the current window fForceField bit is set (set for cases where fields are to be ignored and if the current window is not in a page view mode). If fForcefield is not set, item 1208 sets flag fReturn by exclusive-ORing the value of flag fReturn with a value designated fDiffer for the field which indicates this field should be in the reverse view from other fields as stored in array rgfld. The routine then returns with flag fReturn.

Figure 13:
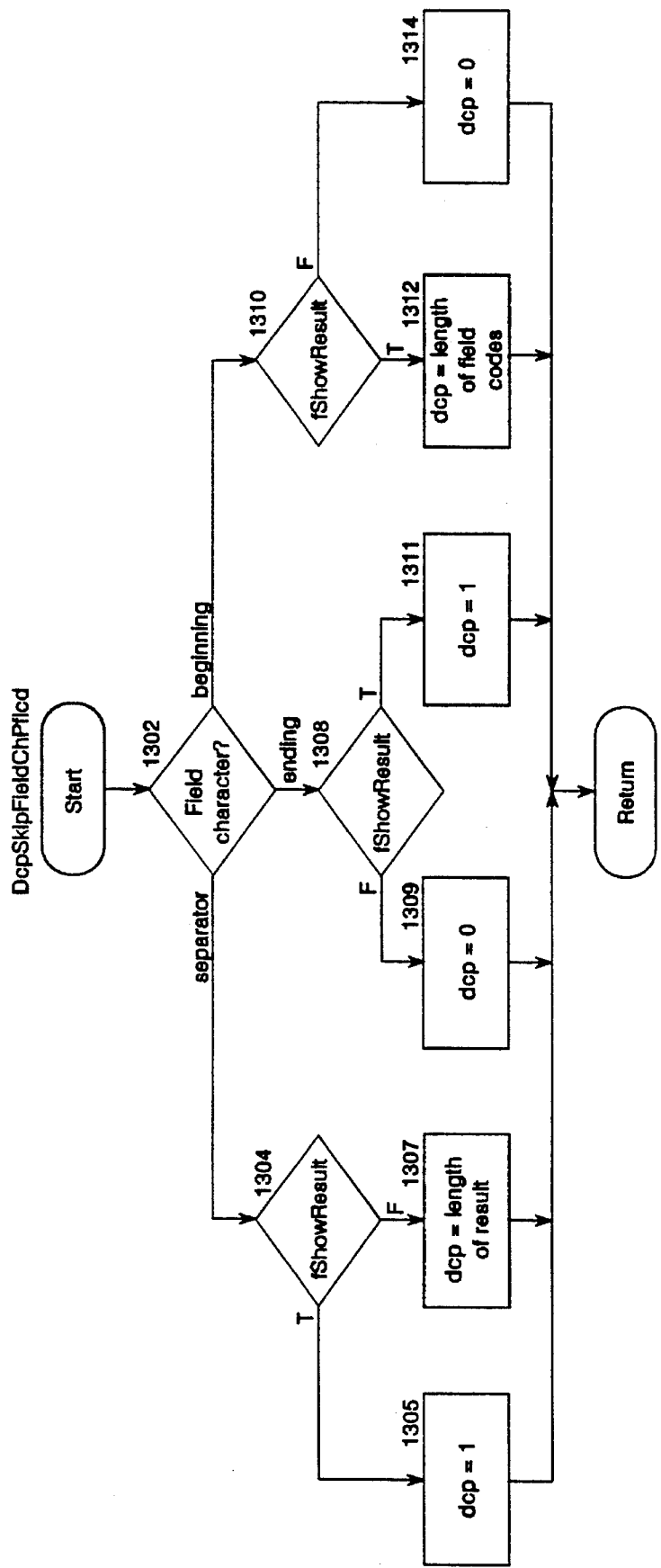
FIG. 13 is a flow diagram of the DcpSkipFieldChPflcd routine called by the routine of FIG. 11.

Referring to FIG. 13, the routine DcpSkipFieldChPflcd is invoked to determine how many character positions to skip based on which field character is currently being evaluated and the ShowResult state of the field. The routine DcpSkipFieldChPflcd receives as arguments the current character, the pointer pflcd to the composite descriptor for the current field, and the flag fShowResult which indicates whether the field should be shown in the result mode. The routine returns the value dcp which indicates the number of character positions to be skipped. When the routine DcpSkipFieldChPflcd is invoked, item 1302 determines the type of the current field character. If the current character is a field separator, decision 1304 determines whether the flag fShowResult is true. If true, item 1305 sets dcp equal to one to indicate the beginning of the result and the routine returns. Otherwise, item 1307 sets dcp equal to the length of the result to indicate that the result is to be skipped and the routine returns. If the field character is an ending field character, decision 1308 determines whether flag ShowResult is true. If true, item 1311 sets dcp equal to one to indicate that the ending field character is to be skipped and the routine returns. Otherwise, item 1309 sets dcp equal to zero to indicate that the ending field character is to be shown and the routine returns. If the current field character is a beginning field character, decision 1310 determines whether flag fShowResult is true. If true, item 1312 sets dcp equal to the length of the field codes to indicate the separate or ending field character and the routine returns. Otherwise, item 1314 sets dcp equal to zero to indicate that the field beginning character is to be displayed and the routine returns.

Figure 14:
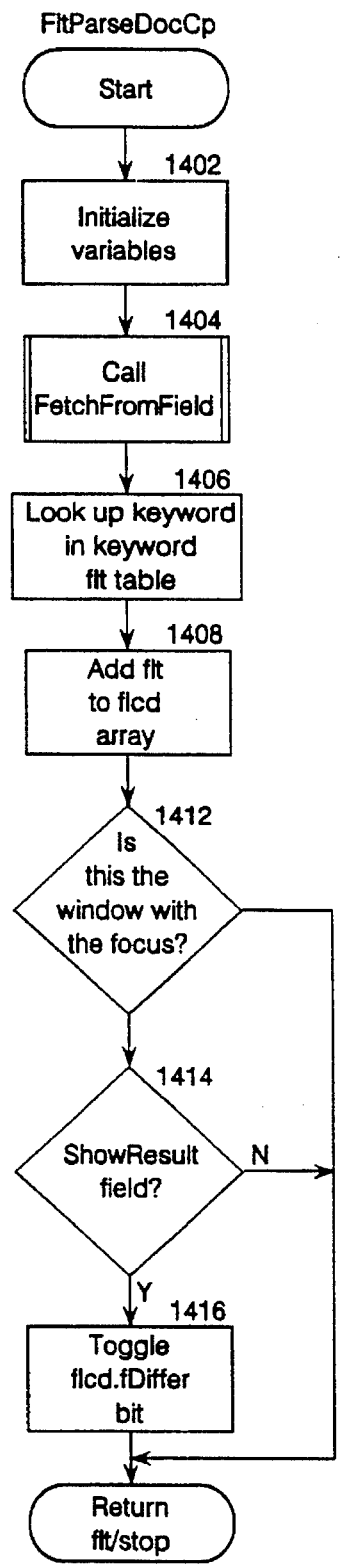
FIG. 14 is a flow diagram of the FltParseDocCp routine used to fetch keyword text and return the field-specific function for the keyword.

Referring now to FIG. 14, the routine FltParseDocCp is invoked to fetch a field keyword and to return the field type (flt) of the keyword. The routine receives as arguments the current document, the current character position and the ifld index into array plcfld. The routine returns the variable flt, which is the index into the array dnflt. When routine FltParseDocCp is invoked, item 1402 initializes the field fetch block. Item 1404 then fetches the first word of the field codes for the field by calling routine FetchFromField. Item 1406 then looks-up the keyword in a keyword flt table. Item 1408 then adds flt information the flcd array. Decision 1412 determines whether the current window is the one with the focus. If the window is not with the focus, the routine returns. Otherwise, item 1414 determines whether ShowResult is true. If not true, the routine returns. Otherwise, item 1416 toggles fDiffer and the routine returns.

In summary, an improved method and system for implementing fields in a document processor has been described with reference to a preferred embodiment. Accordingly, other uses and modifications of this invention will be apparent to persons of ordinary skill without departing from the scope of this invention.

We claim:

1. An improved method of processing fields in a document processor, comprising the steps of:

inputting a plurality of characters organized as a string of text into the document processor;

inserting a field in said string of text, said field comprising a beginning field character, a field code, and an ending field character, said field code specifying a behavior of the field;

placing said string of text in a document;

determining a result of said field based on said behavior specified by the field code; and storing said result in said field within said document that contains the placed string of text having inserted field.

2. An improved method of processing fields in a document processor, comprising the steps of:

inputting a plurality of characters organized as a string of text into the document processor;

inserting a field in said string of text, said field comprising a beginning field character, a field code, and an ending field character, said field code specifying a behavior of the field;

placing said string of text in a document; and determining a result of said field based on said behavior specified by the field code by further performing the steps of:

detecting said beginning field character and calculating a character position of said beginning field character;

looking up said calculated character position in an array of character positions of field characters;

using an index of said calculated character position in said array as the index in an array of field descriptors;

using a field type stored in said field descriptor as an index into an array of field functions;

executing said field function indicated by said index into said array of field functions to effect the behavior of the field code; and storing said result in said field within said document.

3. A method in a computer system of adding a result to a field in a document, the field having a field code, the method comprising the steps of:

retrieving the field code from the field;

determining a result of the field code; and storing the determined result into the document that contains the field having the field code.

4. The method of claim 3 including the step of adding a separator field character to the document to separate the field code from the toted result.

5. The method of claim 4 wherein the field has a beginning field character before the field code and an ending field character after the result.

6. A method in a computer system of adding a result to a field in a document, the field having a plurality of field codes, the method comprising the steps of:

retrieving the plurality of field codes from the field, the field codes containing a system switch indicating non-default behavior for the field;

determining a result of the field codes including effecting the non-default behavior in accordance with the system switch; and storing the determined result in the document.

7. A method in a computer system of adding a result to a field in a document, the field having a plurality of field codes, the method comprising the steps of:

retrieving the plurality of field codes from the field, the field codes containing a keyword and a keyword-specific switch, the keyword-specific switch indicating a non-default behavior for the field;

determining a result of the field codes including effecting the non-default behavior in accordance with the keyword-specific switch; and storing the determined result in the document.

8. A method in a computer system for storing a field within a document, the document comprising a stream of data, the field having a field code and a result, the method comprising the steps of:

storing the field code within the stream of data;

determining the result of the field based on the stored field code; and storing the determined result within the same document that contains the stream of data having the field code.

9. A method in a computer system of nesting a second field within a first field within a document, each field having a plurality of field codes, the method comprising the steps of:

adding the first field to the document;

inserting the second field as a field code of the first field wherein a result of the second field specifies a field code of the first field;

determining a result of the first field; and storing the result of the first field in the document that contains the first field.

10. A method in a computer system of nesting fields within a document, the method comprising the steps of:

adding a first field to the document, the first field having a plurality of field codes, the field codes indicating a function to perform to generate a result;

performing the function indicated by the field codes of the first field to generate the result, wherein the generated result contains a second field; and storing the generated result within the same document that contains the first field.

11. A method in a computer system of generating a result of a field, the field being stored in a document, the field having a plurality of field codes, one field code being a keyword, one field code being a nested field, the keyword specifying a function to perform, the keyword having an associated computer routine to perform the specified function, wherein the computer routine generates a result, the method comprising the steps of:

determining a result of the nested field;

invoking the computer routine associated with the keyword to generate a result based on the determined result of the nested field, the generated result containing a result field;

determining a result of the result field;

determining the result of the field based on the determined result of the result field; and storing the determined result of the field in the document in which the field is stored.

12. A method for using fields in a document processor, a field comprising a beginning field character, a field code, a separator field character, a result, and an ending field character, the field code specifying a behavior to perform to generate the result, the method comprising the steps of:

storing a beginning field character, a field code, and an ending field character in a document;

generating the result of the stored field code;

storing a separator field character in the document in which the field is stored; and storing the determined result of the field in the same document in which the field is stored wherein the stored separator field character separates the stored field code from the stored determined result.

13. A method in a computer system for displaying a field, the computer system having a field codes mode and a result mode, the method comprising the computer-implemented steps of:

loading a document into memory of the computer system, the document containing a field, the field having both a field code and a result within the [same]document;

displaying the field code of the field when the computer system is in field codes mode; and displaying the result of the field when the computer system is in the result mode.

14. The method of claim wherein the computer program is a document processor.

15. A method in a computer system for processing fields within a document, the method comprising the steps of:

receiving a plurality of characters;

storing the received plurality of characters within the document;

receiving a field code that specifies a behavior to be performed by the computer system to generate a result;

storing the field code within the document;

performing the behavior of the field code to generate the result; and storing the result within the document;

when the document is displayed in a field codes mode, displaying an indication of the stored field code; and when the document is displayed in a result mode, displaying an indication of the stored result of the field code.

16. The method of claim 15 wherein when displaying the indication of the stored field code, displaying a beginning field character and an ending field character and displaying the indication of the stored field code in between the displayed beginning field character and ending field character.

17. The method of claim 15 wherein when displaying the indication of the stored field code, displaying a beginning field character and an ending field character and displaying the indication of the stored field code, a separator character, and an indication of the stored result in between the displayed beginning field character and ending field character.

18. A method in a computer system for calculating results of fields stored in a document, each field having one of a plurality of field codes that specify a behavior to perform to generate a result of the field, the method comprising the computer-implemented steps of:

loading a mapping from each of the plurality of field codes to an associated function that performs the specified behavior to generate a result of a field that has the field code; and for each field in the document,
retrieving the field code of the field;
identifying from the loaded mapping the function associated with the retrieved field code;
invoking the identified function; and
under control of the invoked function,
performing the specified behavior of the retrieved field to generate a result of the field; and
storing the generated result in the document.

19. The method of claim 18 including the steps of:
for each field in the document.
retrieving the stored result of the field; and
displaying the retrieved result a display device.

20. The method of claim 18 including the steps of:
for each field in the document,
retrieving the field code of the field; and
displaying the retrieved field code on the display device.

21. The method of claim 18 wherein the step of storing the generated result in the document stores the generated result within the field in the document.

22. The method of claim 18 wherein a field includes an argument indicating a variation in the specified behavior of the field code and wherein the step of performing the specified behavior does so base indicated variation.

23. The method of claim 18 including the step of after storing the generated result in the document, deleting any previous result of the field.

24. A method in a computer system for processing a plurality of fields within text of a word processing document, the method comprising the steps of:

displaying the text of the word processing document on a display device; and for each of the plurality of fields, receiving an indication of a position within the text of the word processing document;

receiving an indication of the field to be inserted at the indicated position within the text of the word processing document, the field having a field code specifying a behavior to perform to generate a result of the field;

inserting the indicated field at the indicated position within the text of the word processing document;

performing the specified behavior of the field code of the inserted field to generate a result of the field and storing the generated result with the field within the word processing document; and displaying, within the displayed text of the word processing document, the generated result of the field at a position corresponding to the indicated position.

25. The method of claim 24 including the steps of:
after displaying the generated result of each field,
receiving an indication to re-perform the specified behavior of the fields inserted into the text of the word processing document; and
in response to receiving the indication to re-perform,
for each field code within the text of the word processing document,
performing the specified behavior of the field code of the field to re-generate a result of the field; and
storing the re-generated result within the text of the word processing document.

26. The method of claim 25 including the step of deleting the generated result that is stored with the text word processing document.

27. The method of claim 24 wherein each field code has an associated function for performing the specified behavior and the step of performing includes identifying the function associated with the field code and executing the function to perform the specified behavior.

* * * * *

UNITED STATES PATENT AND TRADEMARK OFFICE
CERTIFICATE OF CORRECTION

PATENT NO. : 5,552,982
DATED : September 3, 1996
INVENTOR(S) : Peter C. Jackson et al.

It is certified that error appears in the above-indentified patent and that said Letters Patent is hereby corrected as shown below:

In column 17, claim 4, line 33, please delete "toted" and insert therefor --stored--.

In column 17, claim 8, line 66, please delete "same".

In column 18, claim 14, line 66, please delete "program" and insert therefor --system--.

In column 20, claim 22, line 7, please delete "base" and insert therefor --based on the--.

In column 20, claim 26, line 49, following the word "text" please insert --of the--.

Signed and Sealed this

Twenty-fourth Day of December, 1996

Attest:

BRUCE LEHMAN

*Attesting Officer*    *Commissioner of Patents and Trademarks*